United States Patent

[11] 3,604,966

| [72] | Inventor | John V. Liggett |
| | | Westland, Mich. |
| [21] | Appl. No. | 859,775 |
| [22] | Filed | Sept. 22, 1969 |
| [45] | Patented | Sept. 14, 1971 |
| [73] | Assignee | Kelsey-Hayes Company |
| | | Romulus, Mich. |

[54] ROTATIONAL SPEED SENSOR
9 Claims, 2 Drawing Figs.

[52] U.S. Cl. .................................................. 310/168
[51] Int. Cl. .................................................. H02k 17/42
[50] Field of Search ..................................... 310/168,
169, 170, 90

[56] References Cited
UNITED STATES PATENTS

| 2,500,730 | 3/1950 | Yonkers | 310/168 |
| 2,945,141 | 7/1960 | Van DeGraaff | 310/168 |
| 3,267,399 | 8/1966 | Spieker | 310/168 |
| 3,317,765 | 5/1967 | Cone | 310/168 |
| 3,458,741 | 7/1969 | Woodward | 310/168 |
| 3,482,129 | 12/1969 | Riordan | 310/90 |

*Primary Examiner*—D. F. Duggan
*Assistant Examiner*—R. Skudy
*Attorney*—Harness, Dickey & Pierce ABSTRACT: A rotational speed sensor for a skid control system for sensing the rotational speed of a prop shaft of a wheeled vehicle having a rotor mounted for rotation with a prop shaft and a stator mounted on the differential housing of the vehicle. The stator and rotor are provided with confronting circumferentially disposed teeth with the stator further including a coil for providing an output signal to the skid control system and the rotor further including a magnet for establishing a flux through the coil.

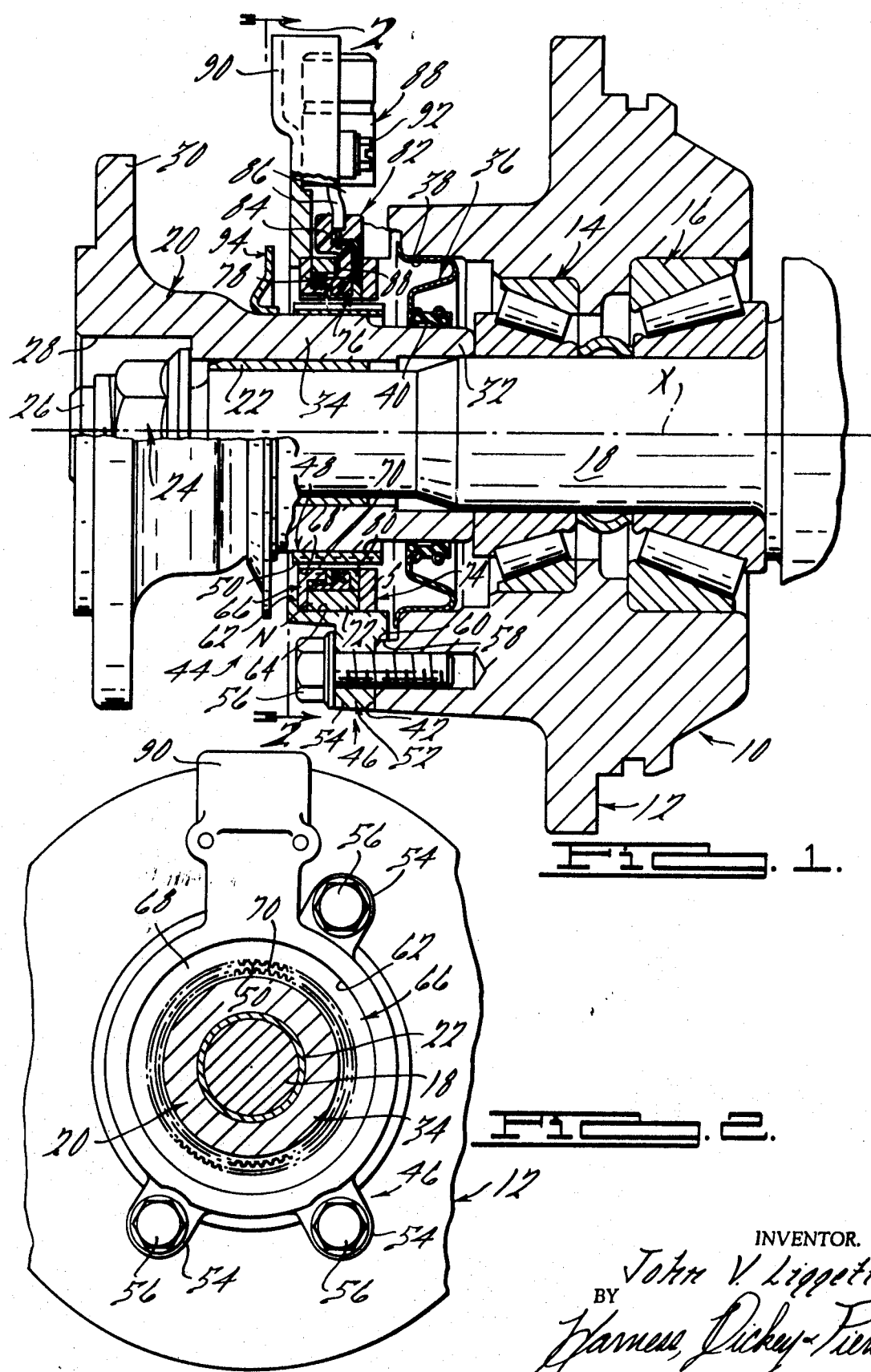

ROTATIONAL SPEED SENSOR

SUMMARY BACKGROUND OF THE INVENTION

The present invention relates to speed sensors.

It is necessary especially in conjunction with some skid control systems to utilize a sensor for sensing the speed of the rear wheels of an automotive vehicle. In some skid control systems this is done with an individual sensor located at each wheel; in a skid control system in which the average wheel speed between the two rear wheels can be utilized, it has been found advantageous to utilize only a single sensor and locate that sensor at the differential to sense the speed of the propeller shaft which generally is the average speed of the two wheels. In the present invention, the wheel speed sensor is adapted to have one part (the rotor) mounted with the propeller shaft and the other part (the stator) mounted upon the differential housing. By locating the parts near the differential bearings, a high degree of dimensional accuracy can be relied upon and close clearance can be utilized in the airgap between rotor and stator whereby an efficient and effective sensor construction can be provided. Therefore it is an object of the present invention to provide a novel sensor construction. It is another object of the present invention to provide a novel sensor construction adapted to be mounted in conjunction with the differential and/or prop shaft of an automotive vehicle.

Other objects, features, and advantages of the present invention will become apparent from the subsequent description and the appended claims, taken in conjunction with the accompanying drawing, in which:

FIG. 1 is a side view with some parts shown in section and others broken away of apparatus embodying features of the present invention; and FIG. 2 is a sectional view of the apparatus of FIG. 1 taken generally along the line 2—2.

Looking now to FIG. 1 the differential assembly, only partially shown, is generally indicated by the numeral 10 and includes a housing portion 12 in which is mounted a pair of support bearings 14 and 16. The bearings 14 and 16 rotatably support a spindle portion 18 which in conventional practice is utilized to transmit the input power from the propeller shaft to the rear wheels (through appropriate gears, etc.). A yoke member 20 is supported on the outer end 26 of the spindle 18 and is held from rotation by means of the interconnecting splined engagement by splines 22 and is axially held in place by means of a nut 24 threaded on the outer end 26 and in engagement with the internal wall of a counterbore 28 at the outer end of the yoke 20. The yoke 20 also terminates at its outer end in a flange portion 30 which is adapted to be connected to one end of the propeller shaft assembly (the details of which have been omitted for purposes of simplicity). The outside surface of the yoke 20 is provided with a pair of coaxial, stepped diameter portions 32 and 34 which are substantially accurately located relative to the axis X of the yoke 20 for a purpose to be seen. An annular bearing seal assembly 36 is supported within a counter bore 38 at the rearward end of the housing portion 12 and has a flexible sealing portion 40 adapted to engage the smooth smaller diameter portion of 32 of the yoke 20. The housing portion 12 is constructed to terminate at a radially flat surface portion 42 which is located generally approximate to the seal assembly 36. A sensor 44 comprises a stator assembly 46 which is mounted to the housing portion 12 and a rotor 48 which is mounted to the yoke 20.

The rotor 48 is of a generally ring-shaped construction and is supported with an interference fit upon the smooth, larger diameter portion 34 of the yoke 20. The rotor 48 is provided with a plurality of axially extending teeth 50 which are located in confrontation with the stator assembly 46. The stator assembly 46 includes a generally cup shaped outer housing member 52 which includes a plurality of ears 54 adapted to engage the flat surface 42 of the housing portion 12 of the differential 10 whereby the entire stator 46 can be supported by means of a plurality of bolts 56 extending through openings in the ears 54 and in the flat surface 42. In order to insure that the stator assembly 46 will be accurately located radially with reference to the axis X of the spindle 18 and hence of the axis of the rotor 48 the housing 52 is provided with a locating flange 58 which is dimensioned to snugly fit within a counter bore portion 60 at the rearward most end of the housing portion 12 whereby the stator assembly 46 will be accurately located. The openings through the lugs 54 are made oversize relative to the bolts 56 to provide accurate location by the engagement between the flange 58 and the surface 60. The housing 52 is provided with a central clearance opening 62 and a counter bore 64. A first pole piece 66, having a general L-shaped cross section, is located snugly within the counter bore 64 against the flange 62 and has an axially elongated leg portion 68 which terminates in confrontation with an approximate to the radially outer teeth 50 of the rotor 48. The leg portion 68 has a similar plurality of axially extending teeth 70.

An annular ring-shaped magnet 72 is located snugly within the counter bore 64 and is polarized at its axially opposite ends generally as indicated. A second pole piece 74 is of a generally flat, ring construction and is also snugly supported within the counter bore 64 against one end of the magnet 72. The pole piece 74 has its radially inner extremity located proximate to the teeth 50 of the rotor 48.

A bobbin assembly 76 is located in the void defined by the magnet 72 and the pole pieces 66 and 74 and hence has a cross section with a stepped configuration. Bobbin assembly 76 includes a coil member 78 which is wound within and encapsulated within a plastic outer housing 80. The housing 80 of the bobbin assembly 76 includes a generally radially extending connector support portion 82 which supports a pair of connectors 84 to which are connected a pair of flexible conductors 86. The connectors 84 are cast within the housing 80 and, of course, are connected to opposite ends of the coil 78. The magnet ring 72 is provided with a slot 88 to permit room for the connector support portion 82. A conventional female connector assembly 88 is connected to the conductors 86 and provides a suitable and convenient means whereby plug in connection can be made to the coil 78 and the output from the sensor 44 can be received.

The support housing 52 has a radially outwardly extending connector support portion 90 which is located in line with the connector 80. The connector assembly 88 and support portion 90 each have a pair of ear portions which are located in line with each other; the connector assembly 88 is secured to the support portion 90 by means of a pair of screw members 92. Note that the support portion 90 adds support to the reflexibly mounted connector assembly 88 and in addition provides some measure of protection thereto from damage from flying objects. A generally dish-shaped baffle member 94 is supported on the yoke 20 approximate to the sensor assembly 44 and provides means of protecting the sensor assembly 44 from water, dirt, stones and other elements which could damage the sensor assembly 44.

In operation, the coil 78 will generator a potential therein in accordance with the change in flux as caused by the relative rotation between the toothed rotor 48 and the toothed leg portion 68. Thus, when the teeth 50 and 70 are in line with each other, a magnetic path from the magnet 72 around the coil 78 will be at a minimum reluctance whereas when the teeth of one are located in alignment with a gap of the other, the magnetic path will have a maximum reluctance. The change in magnetic flux as a result of the change of reluctance will result in an output potential being generated in the coil 78, the frequency of which will be indicative of the frequency of rotation of the yoke 20 and hence of the prop shaft of the vehicle to provide an average output signal indicative of the average speed of the rear wheels of the vehicle.

Note that with the construction as shown, a compact structure can be realized; note also that by locating the component parts of the sensor assembly 44 approximate to the bearings 14 and 16 of the differential, a high degree of dimensional accuracy can be depended upon whereby the gap between the stator 48 and the cooperating pole pieces 66 and 74 of the rotor assembly 46 can be maintained at a minimum whereby the efficiency of the sensor assembly 44 can be enhanced. Also note that by locating the sensor assembly 44 approximate to the bearing seal 36 a separate additional shield for the bearing 36 is not required and one baffle or shield 94 can be provided to protect the sensor assembly 44 and the seal 36.

While it will be apparent that the preferred embodiments of the invention disclosed is well calculated to fulfill the objects above stated, it will be appreciated that the invention is susceptible to modification, variation and change without departing from the proper scope or fair meaning of the invention.

What is claimed is:

1. A skid control system for a vehicle having a prop shaft for driving a pair of wheels of the vehicle and a differential including a spindle and a differential bearing mounting said spindle for rotation with said prop shaft comprising a differential housing means having an axially extending locating surface accurately located relative to the differential axis, a sensor for sensing the average rotational speed of said driven pair of five wheels comprising; rotor means having a plurality of circumferentially disposed first teeth, stator means having a plurality of circumferentially disposed second teeth in confrontation with said first teeth and including coil means for providing an electrical output signal for said skid control system representative of the average rotational speed of the driven wheels in response to relative rotation between said rotor means and said stator means, and first support means supporting said rotor means for rotation with the spindle proximate said differential bearing and second support means supporting said stator means to the differential proximate said differential bearing, said second support means including a mating surface engageable with the locating surface for accurately locating the axis of said stator means relative to the differential axis, whereby a high degree of dimensional accuracy is provided at said confronting first and second teeth so that a minimum gap between said first and second teeth may be maintained.

2. The apparatus of claim 1 wherein the differential housing means locating surface is accurately located relative to the differential axis and wherein said stator support means mating surface is a flange engageable with the locating surface for accurately locating the axis of said stator means relative to the differential axis.

3. The apparatus of claim 1 with the locating surface being a bore surface and with said stator means including an outer, generally annular housing member having a flange with an annular surface defining said mating surface.

4. The apparatus of claim 3 with said stator means including an electrical connector connected to said coil means by a flexible conductor, said housing member comprising a radially extending support portion connected to and supporting said connector.

5. A skid control system for a vehicle having a prop shaft for driving a pair of wheels of the vehicle and a differential, a spindle and a differential bearing mounting said spindle for rotation with said prop shaft comprising a differential housing means having an axially extending locating surface accurately located relative to the differential axis, a sensor for sensing the average rotational speed of said driven pair of wheels; rotor means having a plurality of circumferentially disposed first teeth, stator means having a plurality of circumferentially disposed second teeth in confrontation with said first teeth and including coil means for providing an electrical output signal for said skid control system representative of the average rotational speed of the driven wheels in response to relative rotation between said rotor means and said stator means, and first support means supporting said rotor means for rotation with the spindle proximate said differential bearing said second support means supporting said stator means to the differential proximate said differential bearing, said second support means including a mating surface engageable with the locating surface for accurately locating the axis of said stator means relative the differential axis whereby a high degree of dimensional accuracy is provided at said confronting first and second teeth so that a minimum gap between said first and second teeth so that a minimum gap between said first and second teeth may be maintained, said first support means comprising an outer annular surface portion on a yoke member which is adapted to be connected with the proper shaft and with said rotor means being a generally ring-shaped member.

6. The apparatus of claim 5 with the differential including a housing with said spindle supported in the housing by a bearing assembly and including a seal supported on the housing proximate the bearing assembly for providing a seal between the housing and the shaft, and with the yoke supported on the spindle.

7. The apparatus of claim 6 with the locating surface being a bore surface and with said stator means including an outer, generally annular housing member having a flange with an annular surface defining said mating surface.

8. The apparatus of claim 7 with said stator means including an electrical connector connected to said coil means by a flexible conductor, said housing member comprising a radially extending support portion connected to and supporting said connector.

9. The apparatus of claim 8 comprising a baffle supported on the yoke proximate to said rotor means and said stator means to protect said rotor means and said stator means.

UNITED STATES PATENT OFFICE
CERTIFICATE OF CORRECTION

Patent No. 3,604,966          Dated September 14, 1971

Inventor(s) John V. Liggett

It is certified that error appears in the above-identified patent and that said Letters Patent are hereby corrected as shown below:

Column 2, line 56, delete "generator" and substitute therefor --generate--

Column 3, line 21, delete "five"

Column 4, line 26, delete "so that a minimum gap between said first and second teeth"

Column 4, line 29, delete "proper" and substitute therefor --prop--

Signed and sealed this 21st day of March 1972.

(SEAL)
Attest:

EDWARD M. FLETCHER, JR.
Attesting Officer

ROBERT GOTTSCHALK
Commissioner of Patents